United States Patent
Gehl et al.

(10) Patent No.: US 10,663,662 B1
(45) Date of Patent: May 26, 2020

(54) HIGH DENSITY OPTICAL WAVEGUIDE USING HYBRID SPIRAL PATTERN

(71) Applicant: National Technology & Engineering Solutions of Sandia, LLC, Albuquerque, NM (US)

(72) Inventors: Michael Gehl, Albuquerque, NM (US); Christopher DeRose, Victor, NY (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 0 days.

(21) Appl. No.: 16/397,624

(22) Filed: Apr. 29, 2019

Related U.S. Application Data

(63) Continuation-in-part of application No. 15/782,710, filed on Oct. 12, 2017, now abandoned.

(51) Int. Cl.
  *G02B 6/125* (2006.01)
  *G02B 6/12* (2006.01)
  *G02F 1/01* (2006.01)

(52) U.S. Cl.
  CPC .......... *G02B 6/125* (2013.01); *G02B 6/12* (2013.01); *G02B 6/12009* (2013.01); *G02B 6/12033* (2013.01); *G02F 1/011* (2013.01); *G02F 1/0147* (2013.01); *G02B 2006/12061* (2013.01); *G02B 2006/12085* (2013.01); *G02B 2006/12097* (2013.01); *G02B 2006/12142* (2013.01)

(58) Field of Classification Search
  None
  See application file for complete search history.

(56) References Cited

U.S. PATENT DOCUMENTS

| | | | |
|---|---|---|---|
| 5,953,468 A | 9/1999 | Finnila et al. | |
| 2003/0048815 A1 | 3/2003 | Cook | |
| 2003/0070833 A1* | 4/2003 | Barth | G02B 6/125 174/250 |
| 2004/0076372 A1 | 4/2004 | Philipsen et al. | |
| 2004/0136681 A1 | 7/2004 | Drewery et al. | |
| 2015/0049998 A1* | 2/2015 | Dumais | G02B 6/04 385/115 |

OTHER PUBLICATIONS

Rostami et al. ("Proposal for 1x4 Ultracompact Arrayed Waveguide Grating Based on Si-Nanowire Spirals", IEEE, 2010) (Year: 2010).*

(Continued)

*Primary Examiner* — Michelle R Connelly
(74) *Attorney, Agent, or Firm* — Martin I. Finston; Wendy Koba

(57) ABSTRACT

A hybrid spiral waveguide geometry is proposed that exhibits essentially zero curvature (i.e., infinite bend radius) at the center of the spiral (similar to a Fermat spiral), with the curvature then increasing in value as the spiral moves outward. Advantageously, as the spiral moves away from the center, the spacing between adjacent waveguides quickly approaches a constant value (similar to an Archimedean spiral). This hybrid spiral structure has been found to allow for a high density waveguide to be created with lower loss and requiring a smaller size than many conventional spiral configurations and finds use in optical delay lines, amplifiers and arrayed waveguide gratings.

19 Claims, 9 Drawing Sheets

(56) References Cited

OTHER PUBLICATIONS

Hayes, et al., "GaAs Spiral Optical Waveguides" Journal of Lightwave Technology. vol. 11 No. 3. Mar. 1993.
Dai, et al., "Novel ultrasmall Si-nanowire-based arrayed-waveguide grating interleaver with spirals", Optics Communications 281 (2008) 3471-3475.
Lee et al., "Ultra-low-loss optical delay line on a silicon chip", Nature communications| 3:867 | DOI: 10.1038/ncomms1876 | www.nature.com/naturecommunications, © 2012 Macmillan Publishers Limited.
Rasras, et al., "Integrated Resonance-Enhanced Variable Optical Delay Lines", IEEE Photonics Technology Letters, vol. 17, No. 4, Apr. 2005.
Rostami, A. et al., "Proposal for 1x4 Ultracompact Arrayed Waveguide Grating Based on Si-Nanowire Spirals," IEEE, 2010, 6 pages.
Yamada, et al., 10GHz-spaced arrayed-waveguide grating multiplexer with phase-error-compensating thin-film heaters, Electronics Letters, Mar. 2, 1995, vol. 31, No. 5.

\* cited by examiner

ARCHIMEDEAN SPIRAL

FERMAT SPIRAL

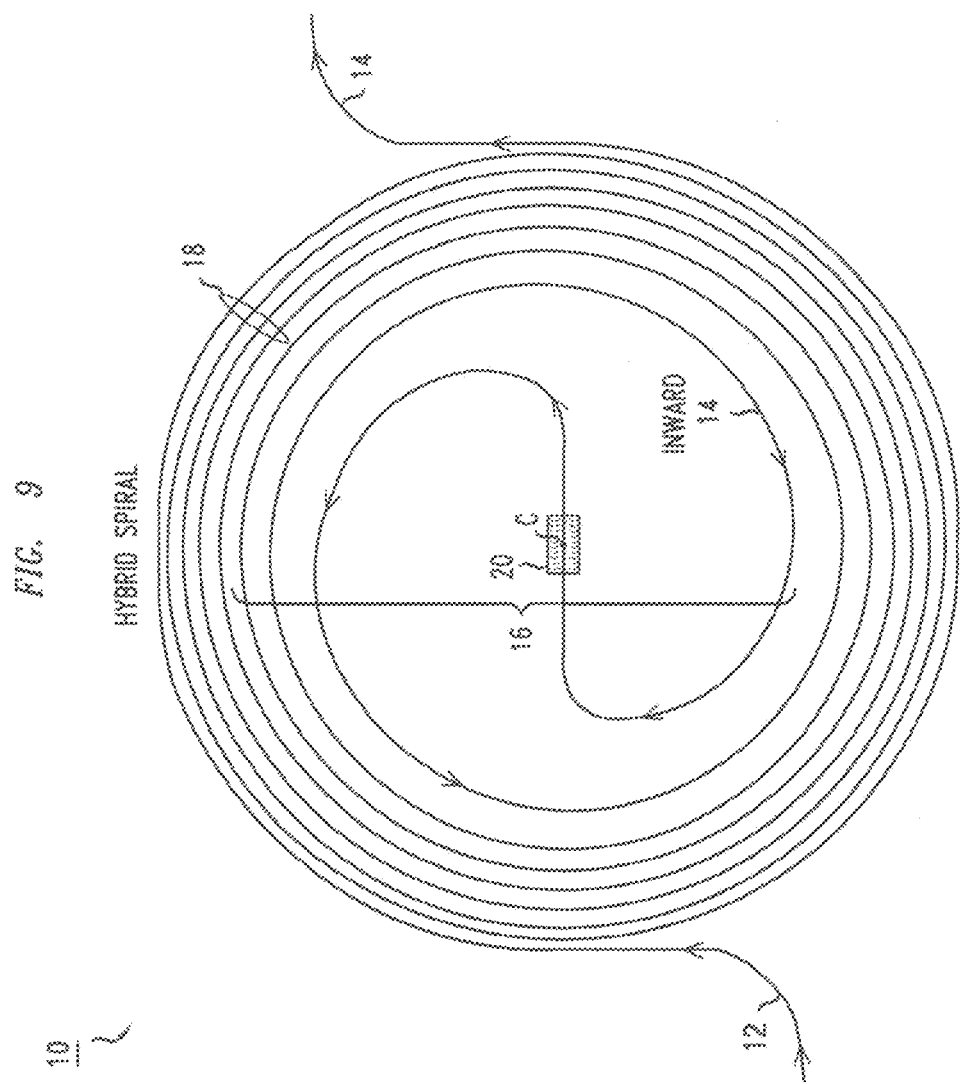

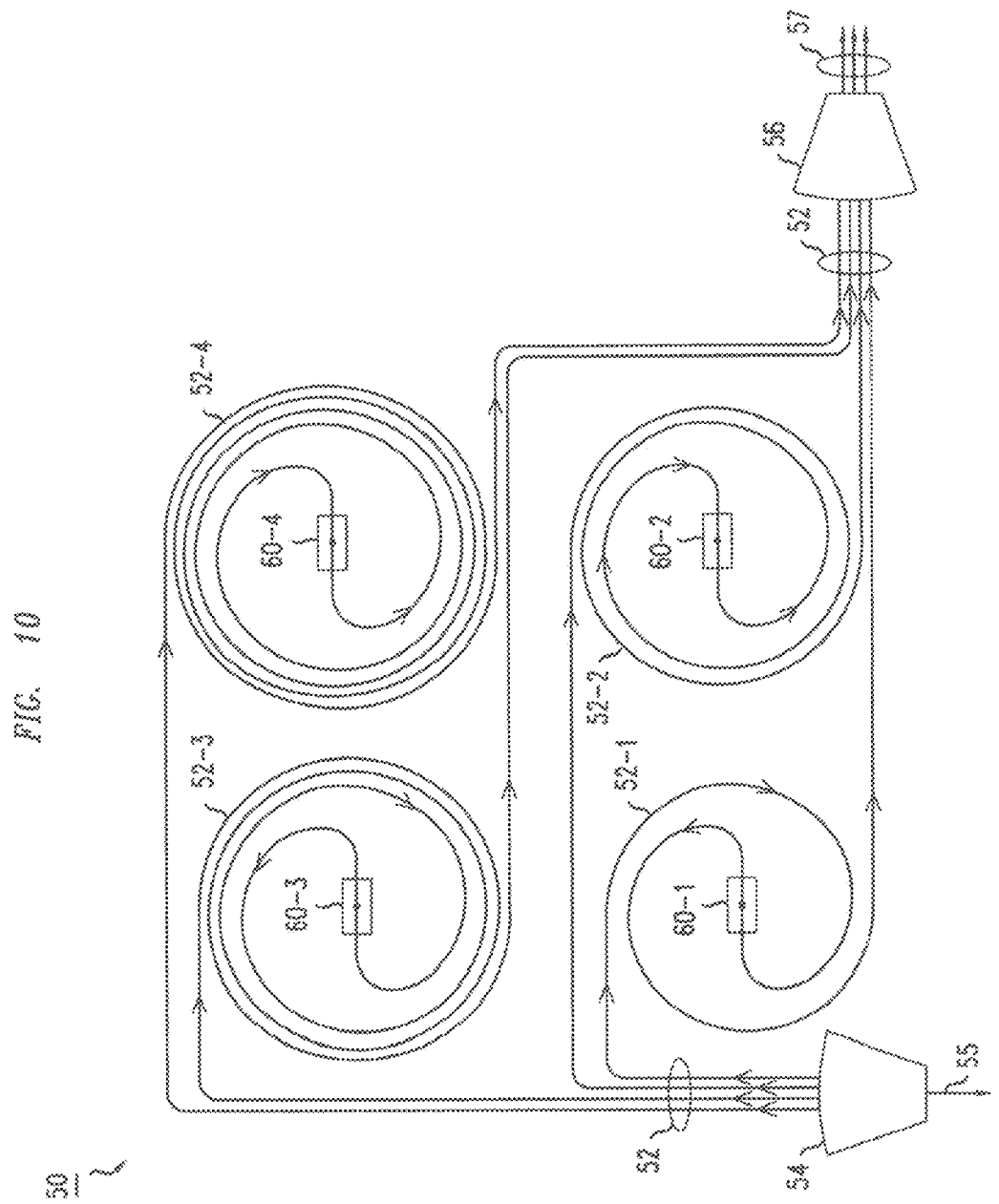

HIGH DENSITY OPTICAL WAVEGUIDE USING HYBRID SPIRAL PATTERN

REFERENCE TO RELATED APPLICATION

This application is a continuation-in-part of prior application Ser. No. 15/782,710, which was filed on Oct. 12, 2017 by Michael Gehl et al. under the title, "High Density Optical Waveguide Using Hybrid Spiral Pattern", and which is commonly owned herewith. The entirety of the above said application Ser. No. 15/782,710 is hereby incorporated herein by reference.

STATEMENT OF GOVERNMENT SUPPORT

This invention was made with Government support under Contract DE-NA0003525 awarded by the United States Department of Energy/National Nuclear Security Administration. The U.S. Government has certain rights in the invention.

BACKGROUND

There are a variety of optical communication system applications that utilize optical waveguides of varying lengths, or simply require the use of relatively long waveguides. For example, optical delay lines are typically based on configurations having two separate optical waveguide paths, with one path having an "optical path length" exactly out of phase with a second path. Optical interferometers are based on similar phase differences. Optical amplifiers based on Raman amplification require waveguides on the order of tens of meters in order to provide a sufficient longitudinal extent for interaction between the signal and pump.

An arrayed waveguide grating (AWG) is one well-known type of component that utilizes a set of optical waveguides of different lengths (from "shortest" to "longest" disposed in an array configuration). The AWG works by splitting incoming light among an array of many waveguides, each with an incrementally longer optical path. The array of waveguides is then recombined in a slab waveguide, where the light from each path interferes such that different spectral slices focus to different spatial locations. By placing a set of waveguides at the focal plane, each spectral slice can be collected by a separate waveguide.

An AWG is commonly used in wavelength division multiplexing (WDM) applications and is preferably fabricated using photonic lightwave circuit (PLC) technology. PLC serves to integrate various optical components and devices in a functional module for a specific application. While PLC technology is able to create patterns of waveguides (such as arrays) on a silicon substrate, the waveguides fabricated in this platform are relatively large and unable to bend around a tight curve without creating significant optical signal loss (i.e., a tight bend tends to disrupt the signal confinement properties of an optical waveguide and allows a portion of a propagating light beam to be directed away from signal path). Because of this, AWGs fabricated using PLC technology can be rather large devices (multiple square centimeters). Moreover, as the number of channels is increased (or as the bandwidth of each channel is decreased), the resultant size of the device quickly grows.

There are also additional minimum-size restrictions imposed by the waveguide-to-waveguide length differential $\Delta L$ in the array and the desired number of waveguides in the array, as well as the focal lengths required in the input and output slabs. Other factors may also play a role in thwarting attempts to shrink AWG device designs. It would be desirable if some of these factors could be overcome to enable smaller AWGs.

SUMMARY OF THE INVENTION

One aspect of the present invention relates to the development of a unique hybrid spiral waveguide geometry that allows for a dense optical waveguide to be implemented without experiencing the signal loss and/or wasted space limitations mentioned above. The hybrid spiral configuration is useful in the formation of optical delay lines of significant length, distributed Raman amplifiers, arrays of fibers for AWG filters, and the like.

In accordance with one or more embodiments of the present invention, a hybrid spiral waveguide geometry is proposed that exhibits essentially zero curvature (i.e., infinite bend radius) at the center of the spiral, with the curvature then increasing in value as the spiral moves outward.

Advantageously, as the spiral moves away from the center, the spacing between adjacent waveguides quickly approaches a constant value (i.e., becomes uniform). This hybrid spiral structure has been found to allow for a high density waveguide to be created with lower loss and requiring a smaller size than many conventional spiral configurations.

Advantageously, a thermo-optic phase shifter may be disposed at the center of the inventive hybrid spiral optical waveguide to provide phase adjustments (required for some applications). The ability to position the phase shifter at the center of the spiral minimizes the possibility of thermal cross-talk between adjacent hybrid spiral waveguides.

An exemplary embodiment of the present invention is the utilization of a set of hybrid spiral waveguides to form an AWG component, significantly reducing the wasted space problems of high-count AWGs. Thermo-optic phase shifters may also be used in this embodiment, with the ability to separately control each phase shifter as necessary to control the output spectra.

One particular embodiment of the present invention takes the form of a high density optical waveguide comprising a hybrid spiral configuration including an inward-directed spiral arm and an outward-directed spiral arm. The spiral arms couple together at a center of the hybrid spiral configuration, wherein the center of the hybrid spiral configuration has a curvature sufficiently close to zero such that there is little optical loss as the propagating signal transitions between the inward-directed spiral arm and outward-directed spiral arm. An outer region of the hybrid spiral configuration is formed to exhibit essentially uniform spacing between adjacent waveguides, providing a high density arrangement.

For the purposes of the present invention, the phrases "sufficiently close to zero" and "approaching zero" both mean a curvature small enough to maintain bend loss between the inward-directed spiral arm and the outward-directed spiral arm to a value less than 0.5 dB (and preferably less than 0.35 dB), and the phrases "essentially uniform spacing" and "essentially constant spacing" both mean spacings within ±1% of a defined value.

BRIEF DESCRIPTION OF THE DRAWINGS

The accompanying drawings, which are incorporated into and form a part of the specification, illustrate several aspects of the present invention and, together with the description, serve to explain the principles of the invention. The drawings are only for the purpose of illustrating preferred embodiments of the invention and are not to be construed as limiting the invention. In the drawings:

FIG. 9 shows an exemplary hybrid spiral optical waveguide formed in accordance with one or more embodiments of the present invention, in this case including a thermo-optic phase shifter positioned at the center of the spiral;

FIG. 10 illustrates an exemplary arrayed waveguide grating (AWG) including a relatively small number of separate hybrid spiral waveguides, illustrating the principles of the present invention.

DETAILED DESCRIPTION

As mentioned above, it is frequently desirable to be able to reduce the physical size of an AWG, either to be able to fit more functions on a chip or to fabricate smaller chips. There are physical limits on how small a conventional AWG can be made, however, since waveguide curves must be made gentle enough to maintain their guiding properties. A significant amount of space is also consumed by the input and output waveguides, which must fan-in or fan-out to direct the light to or from the edges of the chip.

Figure 1:
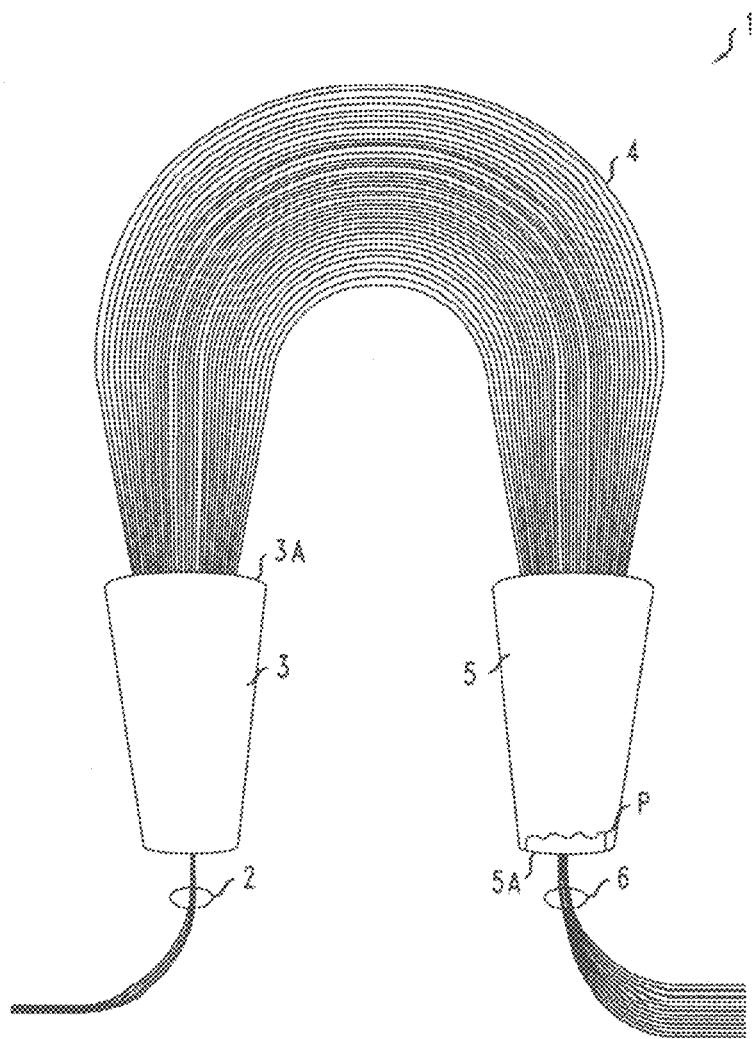
FIG. 1 illustrates a conventional AWG configuration useful in understanding an application of the hybrid spiral waveguide formed in accordance with the principles of the present invention.

FIG. 1 illustrates the layout of a conventional AWG. It comprises a substrate ("die", "chip") 1 supporting one or more input optical waveguides 2 delivering optical energy into an "input slab" region 3. The slab region is a planar waveguide which confines the input optical energy in only the vertical dimension; the energy is permitted to spread transversely without restriction. The input slab is sometimes referred to as an "input free space region", or an "input free propagation region".

An image of the input optical energy (or an interference pattern if there is more than one input optical waveguide) is developed on the far border 3A of input slab region 3. At this border, the light enters the input end of a waveguide array 4 which consists of a plurality of individual waveguides (the number of individual waveguides ranging anywhere from tens to possibly hundreds of waveguides). The individual waveguides are of lengths which increase linearly across the array, each waveguide having a length which differs from its nearest adjacent waveguide by a predefined value ΔL.

Optical energy exits waveguide array 4 at an output end thereof and delivers the light into an "output slab" region 5. Like the input slab, the output slab region is a planar waveguide which confines the optical energy in only the vertical dimension. The energy is permitted to spread transversely without restriction, and for that reason the output slab is sometimes referred to as an "output free space region", or an "output free propagation region".

A diffraction pattern P is developed on the far border 5A of output slab region 5, where the light enters a set of one or more output optical waveguides 6. The structure as shown in FIG. 1 can be used as a demultiplexer if there is only one input waveguide 2 and more than one output waveguide 6; in this case information is carried on multiple channels (wavelengths) in the single input waveguide and the channels are separated out by the AWG for delivery into the different output waveguides. The structure can also be used as a multiplexer if operated in reverse. It can furthermore be used as a router if there are multiple input waveguides 2 and multiple output waveguide 6.

It is apparent from even a cursory observation of the configuration of FIG. 1 that as the number of waveguides increases, the overall size of the AWG rapidly increases. Moreover, as mentioned above, the need to maintain a minimum bend radius for each waveguide results in an ever-increasing area of wasted space in the interior of the structure (i.e., between the input and output slab regions, extending toward the waveguide array).

Figure 2:
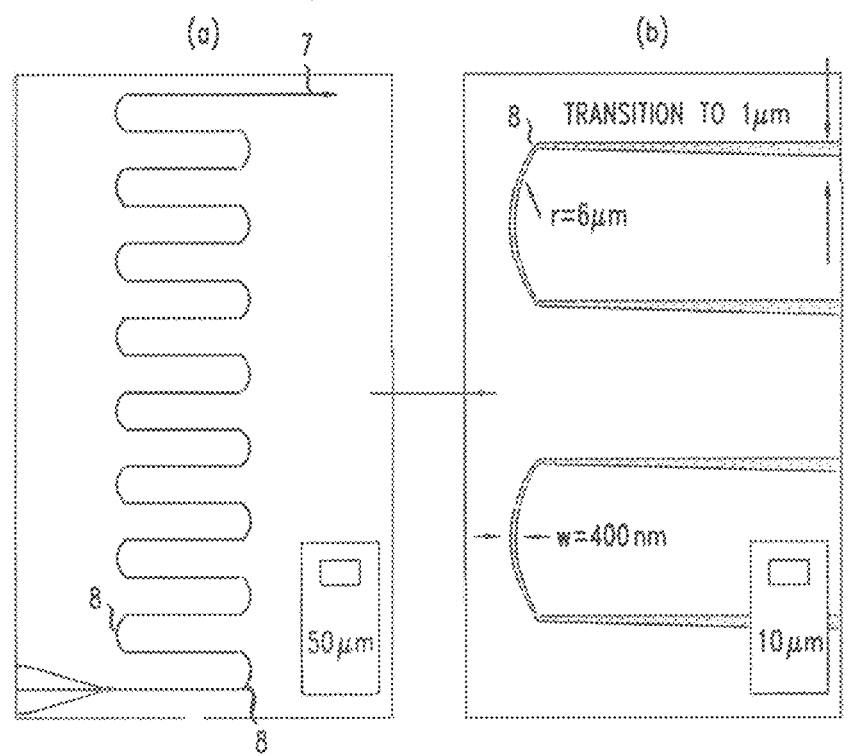
FIG. 2 contains a photograph of a prior switchback optical waveguide geometry used to increase waveguide density.

One approach to compacting the layout of an optical waveguide array is to modify the specific layout of waveguide fiber in the array. For example, a serpentine-like arrangement having a number of switchbacks is considered to substantially reduce the space required for each individual waveguide. FIG. 2 illustrates an exemplary switchback optical waveguide 7, where an optical waveguide of length "L" is folded in a manner that significantly reduces the surface area required for the waveguide. As shown in FIG. 2(a), an end "turn-around" portion 8 of waveguide 7 creates the switchback, directing the propagation of an optical signal back and forth along each separate segment. FIG. 2(b) illustrates enlarged turn-around portions 8 (switchbacks), in this case showing an exemplary minimum radius of curvature on the order of 6 μm, a relatively tight bend radius.

As apparent from FIG. 2, the switchback design relies on including this tight bend radius at every turn back and forth along the serpentine topology of the waveguide. In a silicon-based PLC component, for example, the use of such a tight radius of curvature in the switchbacks demands a fully etched waveguide in order to maintain confinement of the light as it passes through this bend. Unfortunately, fully-etched waveguides are known to have a relatively large propagation loss.

For example, the switchback design as shown in FIG. 2 exhibits a propagation loss (separate from the bend loss) of about 3 dB/cm. In the particular embodiment shown in FIG. 2(b), the waveguide is formed to increase in width along the straight sections between the switchbacks, where this increase in width may reduce this value of propagation loss.

Fully etched waveguides are also sometimes referred to as "ridge waveguides". Generally speaking, a fully etched waveguide has a lower-index substrate and a rectangular ridge of higher-index material that overlies the substrate. In one common example, a ridge of silicon overlies a silica substrate. Waveguides of this kind exhibit relatively strong optical confinement although, as noted above, they may also exhibit relatively high optical loss. In the discussion below, we will refer to waveguides of this kind as "fully etched ridge waveguides".

Several alternatives to fully etched ridge waveguides are known. One such alternative is the partially etched waveguide, also sometimes referred to as a "rib waveguide". In a partially etched waveguide, a planar layer intervenes between the substrate and the rectangular higher-index structure (which in this context is referred to as a "rib"). The intervening planar layer typically has the same index as the rib. Waveguides of this kind typically exhibit weaker optical confinement but lower optical loss than fully etched rib waveguides. In the discussion below, we will refer to waveguides of this kind as "partially etched rib waveguides".

Routing the optical waveguide in the pattern of a spiral has the potential to maximize the use of available space, while minimizing the losses associated with bending. In order to utilize a waveguide in a spiral pattern, the waveguide must spiral in one direction towards the center of the pattern before turning a corner and spiraling back in the opposite direction. The abrupt change in bend direction at the center of the spiral can lead to significant loss if not handled correctly.

Addressing these concerns, one or more embodiments of the present invention relates to the design of a unique spiral pattern that has been found to minimize loss at the center of the spiral, while still providing a dense waveguide packing formation in the outer region of the spiral. In one exemplary embodiment, a hybrid spiral based upon a combination of an Archimedean spiral and a Fermat spiral is utilized.

Figure 3:
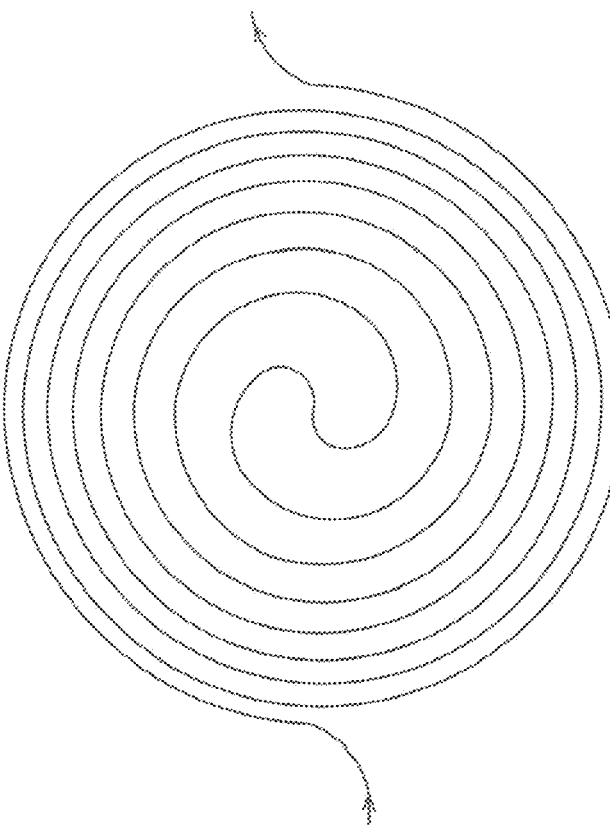
FIG. 3 is a diagram of an Archimedean spiral.

FIG. 3 illustrates a conventional Archimedean spiral. This spiral produces evenly-spaced waveguides, regardless of radius from the center of the spiral. As a result, an Archimedean spiral creates the maximum waveguide density possible. The radius of an Archimedean spiral is defined by the following equation:

$$r = \alpha \theta. \tag{1}$$

Unfortunately, the local curvature of the Archimedean spiral goes toward the value $2/\alpha$ at the center. Moreover, this value changes sign as the waveguide transitions from the inward-propagating portion of the spiral to the outward-propagating portion of the spiral. The change in sign of the curvature leads to a modal mismatch at the center of the spiral, which results in unwanted optical loss.

Figure 4:
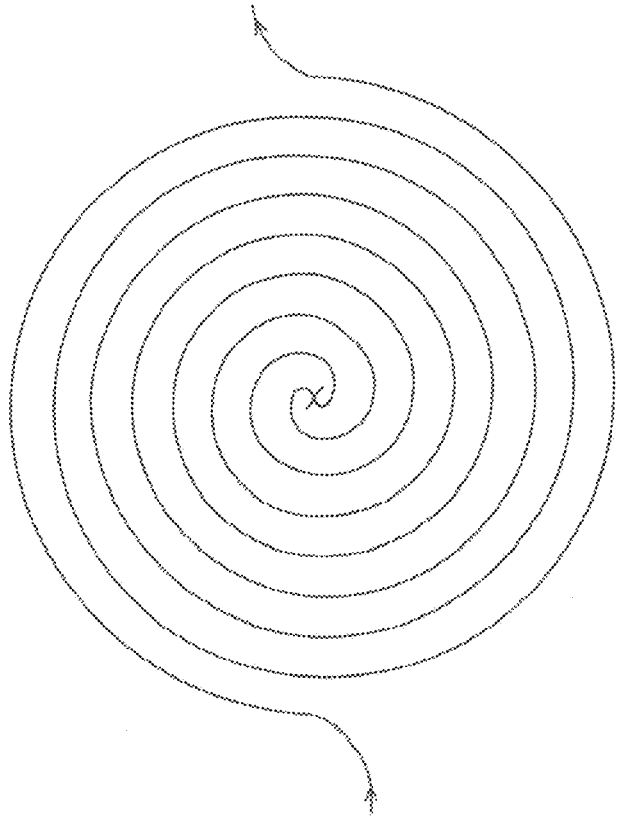
FIG. 4 is a diagram of a Fermat spiral.

FIG. 4 illustrates a conventional Fermat spiral, which is defined by the following relation:

$$r = \alpha \sqrt{\theta}. \tag{2}$$

In contrast to the Archimedean spiral, it is evident from the depiction in FIG. 4 that a Fermat spiral exhibits a local curvature that approaches zero at the center. Therefore, the inward- and outward-propagating modes will be matched at the center of the spiral, minimizing optical loss as the beam transitions between the inward and outward directions. However, the spacing between adjacent waveguides is shown as decreasing with the distance from the center of the spiral. Inasmuch as optical waveguide applications for spiral configurations are associated with utilizing relatively long optical lengths, there would inevitably be crosstalk between adjacent waveguides in the outer region of a Fermat-based optical waveguide spiral.

Figure 5:
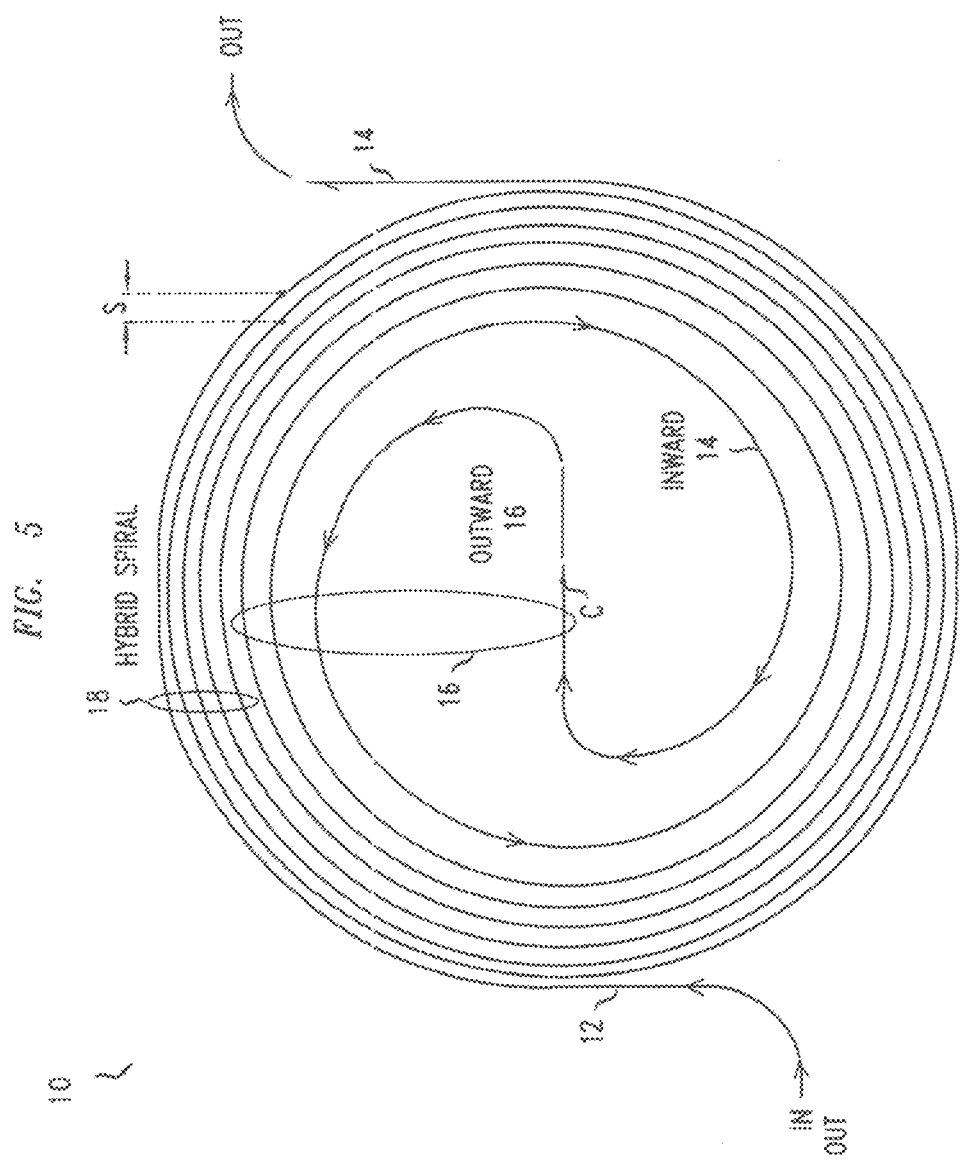
FIG. 5 is a diagram of an exemplary hybrid spiral formed in accordance with the present invention, in this case formed as a combination of the Archimedean spiral and the Fermat spiral.

In accordance with the present invention, it has been found that a hybrid spiral that exhibits attributes of both the Archimedean and Fermat spirals can be properly configured for use as a high density optical waveguide. An exemplary hybrid spiral waveguide 10 formed in accordance with these principles of the present invention is illustrated in FIG. 5. Hybrid spiral waveguide 10 is shown as comprising a first arm 12 supporting the propagation of an incoming optical signal toward the center C of the spiral and a second arm 14 supporting the propagation of this signal in the reverse direction, toward an outer exit of spiral 10. First spiral arm 12 joins second spiral arm 14 at central point C.

In accordance with the principles of the present invention, an interior region 16 of hybrid spiral waveguide 10 exemplifies the Fermat spiral configuration, with a local curvature at center C that approaches zero. A curvature approaching zero at the center of the hybrid spiral minimizes any modal mismatch as the propagating optical signal transitions between inward-directed first arm 12 and outward-directed second arm 14. Said another way, a curvature at the center that is sufficiently close to zero has been found to minimize the amount of optical bend loss between inward-propagating arm 14 and outward-propagating arm 16. Compared to prior art switchback configurations which were known to exhibit a bend loss on the order of 3 dB, the central region of the hybrid spiral exhibits a bend loss less than about 0.5 dB (more particularly, less than about 0.35 dB).

Another feature of the hybrid spiral optical waveguide configuration of the present invention is that the spacing S between waveguide arcs in an outer region 18 of spiral 10 approaches a constant value, similar to the properties of the Archimedean spiral (i.e., uniform spacing in the outer region 18 of spiral 10). Accordingly, the hybrid configuration of the present invention allows for a relatively dense waveguide structure to be created, while also ensuring that the waveguides do not become too close to each other (which may result in optical cross-talk and signal degradation). Thus, one or more exemplary hybrid spiral optical waveguide configurations of the present invention may be characterized as exhibiting a Fermat spiral in an interior region and an Archimedean spiral in an outer region.

As noted above, the prior art switchback configuration of FIG. 2 requires fully etched ridge waveguides to provide the desired amount of optical confinement. By contrast, it has been found that the hybrid spiral waveguides of the present invention may be formed of partially edged rib waveguides, because alleviating the need for very tight spirals relaxes the demand for high optical confinement. Accordingly, the spiral design of the present invention can be made in lower loss, partially etched rib waveguides while still achieving a waveguide density twice that of a switchback design.

In particular, it can be shown that the benefits of both types of spirals can be described by joining their defining equations in the following manner:

$$r = a\left(1 + \frac{k}{\theta}\right)^c \theta. \tag{3}$$

In the limit of small r, this equation becomes a Fermat spiral:

$$\lim_{\theta \to 0} a\left(1 + \frac{k}{\theta}\right)^c \theta = ak^c \theta^{1-c}. \tag{4}$$

For the purposes of explanation, k and c have been introduced to create a more general form of this equation. For the case of k=1 and c=½, equation (4) reduces to equation (2). In the limit of large r, equation (3) becomes an Archimedean spiral:

$$\lim_{\theta \to \infty} a\left(1 + \frac{k}{\theta}\right)^c \theta = a\theta. \quad (5)$$

As those skilled in the art will understand, a spiral-configured waveguide designed in accordance with Equation 3, for example, will have an outer region and an inner region. In the outer region, the arms will conform to a spiral of a type having essentially uniform spacing between adjacent turns, whereas in the inner region, the arms will conform to a spiral of a type having a curvature that tends toward zero as the central portion is approached. Each arm will asymptotically conform itself to one type of spiral in the outer region and to the other type of spiral in the inner region.

Using the general form of equation (3), it has been found that selecting the values of k and c can be controlled to set the minimum bending radius of the hybrid spiral optical waveguide, while also maximizing the density of the waveguide configuration. That is, for a defined length L of an optical waveguide, a hybrid spiral configuration can be formed in accordance with the principles of the present invention that provides the maximum waveguide density without exceeding the minimum bend radius or suffering from modal mismatch at the center of the spiral.

Figure 6:
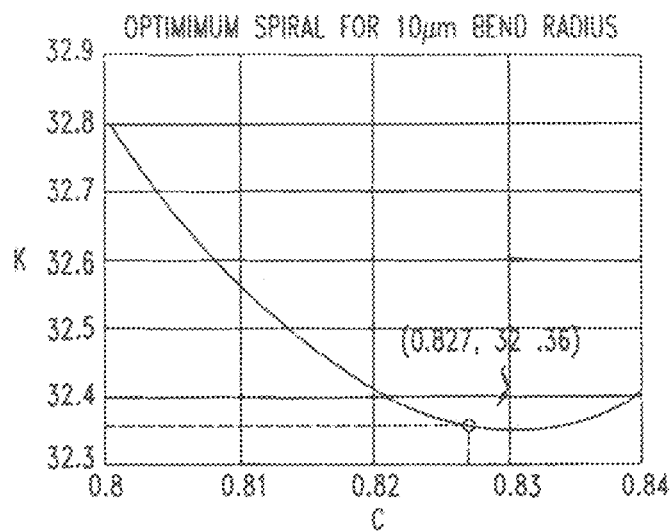
FIG. 6 is a graph showing the optimum spiral characteristics, in terms of the variables k and c for a spiral with a 10 μm bend radius.
Figure 7:
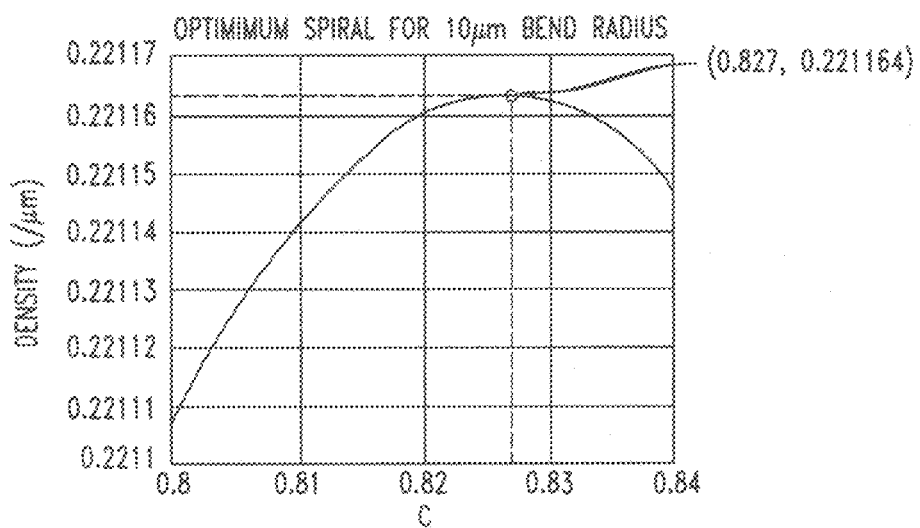
FIG. 7 is a graph showing waveguide density, as a function of c, for a spiral with a 10 μm bend radius.

For example, FIG. 6 plots the values of k and c which provide an exemplary minimum bend radius of 10 μm. Point I defines the optimum combination of k and c for this specific bend radius, shown as k=32.36 and c=0.827. FIG. 7 shows that for this value of c, a waveguide density of 0.221/μm is achieved.

Figure 8:
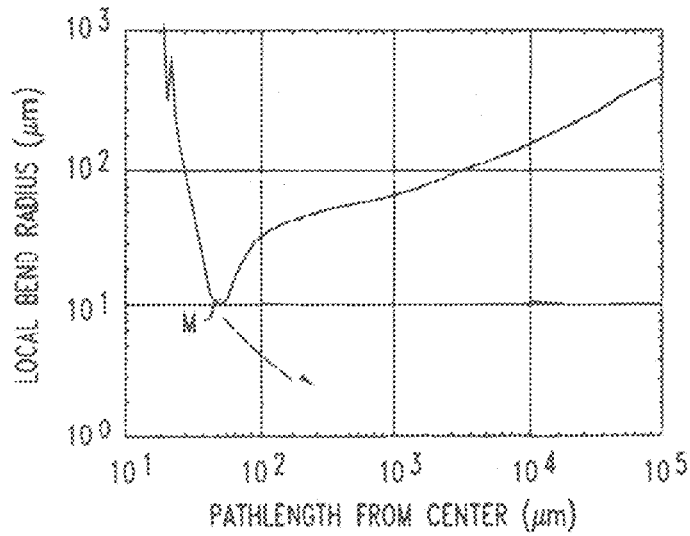
FIG. 8 is a graph showing the calculated local radius of curvature for the optimum spiral of FIGS. 6 and 7.

FIG. 8 is a plot of local bend radius as a function of path length for the above-defined values of k=32.36 and c=0.827. As shown, the radius of curvature approaches infinity at the center of the spiral (i.e., the curvature itself approaches zero, its radius (derivative) approaches infinity), and then decreases as one moves outward from the center of the spiral. As a confirmation of the above analysis, it is shown that a minimum bend radius (shown as M in FIG. 7) for these particular k and c values is 10 μm. Moreover, it is possible to define a relatively large minimum bend radius (say, for example 35 μm) and then find the optimum values of k and c that maximize the waveguide density for this given bend radius.

In example embodiments, the spiral configuration is constituted by a partially etched silicon rib waveguide. The bend radius of the waveguide at the location of minimum bend radius (i.e., the location of greatest curvature) is in the range 35-100 μm.

In other example embodiments, the spiral configuration is constituted by a fully etched silicon ridge waveguide. The bend radius of the waveguide at the location of minimum bend radius (i.e., the location of greatest curvature) is in the range 6-12 μm.

Significantly, a hybrid spiral as described here can achieve essentially uniform spacing between waveguides after only a few turns. In typical examples, six turns of the outward-directed spiral arm will be sufficient to reach a region of essentially uniform spacing. This behavior is more easily understood with reference to FIG. 8A, to which attention is now directed.

Figure 8A:
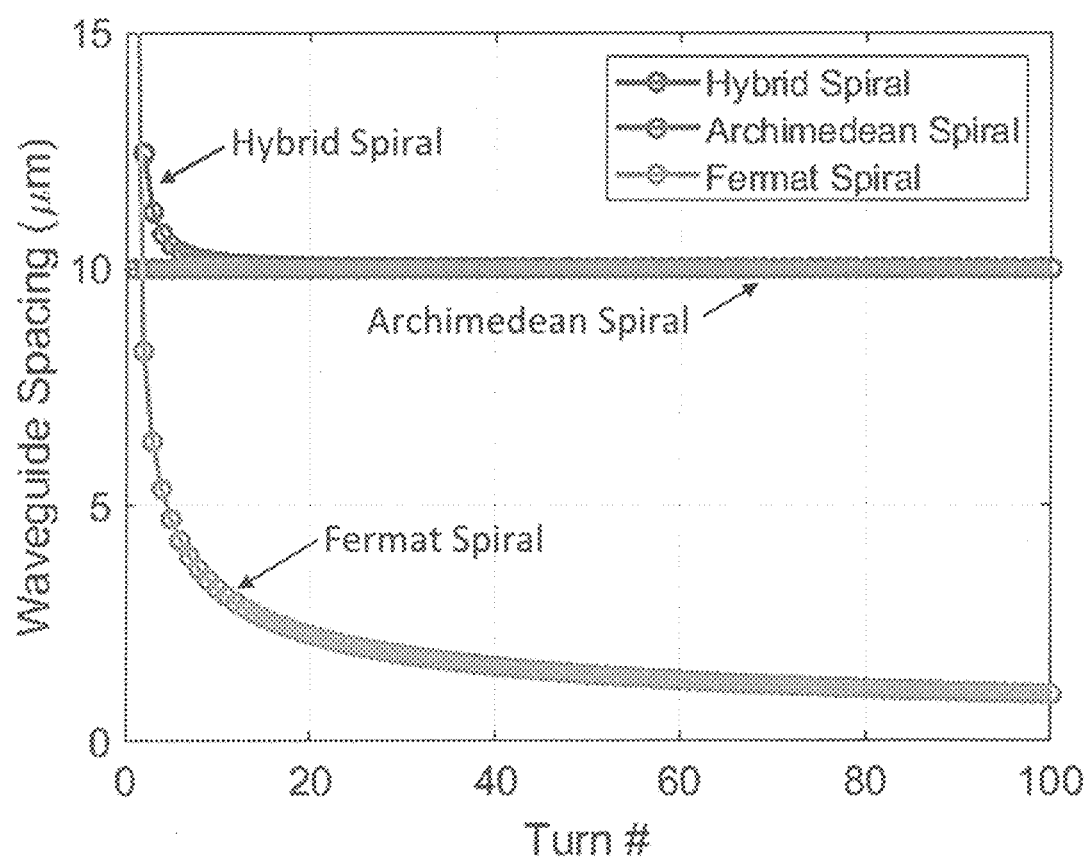
FIG. 8A is a graph of waveguide separation as a function of the turn number. There are separate plots for examples of the Archimedean, Fermat, and hybrid spiral, respectively.

FIG. 8A is a graph of waveguide separation as a function of the turn number. There are separate plots for examples of the Archimedean, Fermat, and hybrid spiral, respectively. As seen in the graph, the Archimedean spiral has constant separation. In the Fermat spiral, the waveguide separation continues to fall with each turn. The waveguide separation in the Fermat spiral does not approach a constant finite value. Instead, it asymptotically goes to zero. The hybrid spiral initially has a large waveguide separation due to the zero curvature at its center, but it quickly approaches a constant separation so that its outer region resembles the Archimedean spiral.

Considering, for example, a hybrid spiral configuration in which the inward-directed spiral arm and the outward-directed spiral arm each have at least eight turns, it will be evident that the outer essentially uniformly spaced region can be reached in such a configuration within six turns of the outward-directed arm. It will likewise be evident that because the waveguide separation asymptotically approaches a constant finite value, the outer essentially uniformly spaced region can readily be designed to contain, e.g., at least eight turns of the inward-directed spiral arm and at least eight turns of the outward-directed spiral arm.

When utilizing a silicon-based PLC arrangement to form a hybrid spiral optical waveguide, it is possible to include a thermo-optic-based phase shifter within the structure to efficiently provide adjustment of the phase of the beam propagating along the waveguide. In a PLC embodiment, such a thermo-optic phase shifter is typically formed of an n-doped portion of silicon disposed alongside a section of the waveguide. The n-doped portion acts as a resistor and is heated by passing current through it. As the temperature of the silicon waveguide changes, so too does its refractive index. This results in a change of the optical phase of the light propagating along the waveguide.

FIG. 9 illustrates hybrid spiral waveguide 10 of FIG. 5, with a thermo-optic tuning arrangement 20 shown as fabricated at the center of the spiral. It is an advantage of the hybrid spiral optical waveguide configuration of the present invention that the placement of the n-doped resistor 20 at the center of the spiral waveguide functions to heat only a central portion of that waveguide (for example, not extending beyond interior region 16), minimizing any thermal perturbations from heaters associated with other nearby waveguides (i.e., thermal isolation between adjacent waveguides). Said another way, the "thermal cross-talk" between adjacent waveguides is minimized.

Moreover, the placement of the tuning arrangements at the centers of respective spirals in an AWG or the like facilitates independently controllable tuning of the respective spirals.

Additionally, by spiraling the waveguide around its own phase shifter, it is possible to effect a maximum change in temperature of the waveguide while minimizing the change in temperature of nearby spirals. The efficiency of the tuning process is also improved for the hybrid spiral configuration (when compared to various prior art simple or switchback arrangements), inasmuch as the same waveguide interacts multiple times with the heat as it spreads outward from the center of the spiral. That is, as the heat flows away from the phase shifter, it will encounter the same waveguide multiple times. The multiple encounters thus increase the efficiency of the phase shifter, as a smaller change in temperature will be able to create a greater phase shift.

Moreover, the thermal conductivity of silicon waveguides is about one hundred times greater than the thermal conductivity of the surrounding silicon dioxide material. Therefore, the multiple layers of silicon waveguide in the slab of silicon dioxide used to form the spiral will dissipate the heat of the phase shifter, also decreasing the amount of heat that is able to pass beyond the extent of the spiral and influence (deleteriously) neighboring spirals (again, minimizing thermal cross-talk).

In addition to being compact, the hybrid spiral optical waveguide configuration of the present invention is especially well-suited for use in AWG designs. FIG. 10 illustrates an exemplary AWG 50 including a set of four separate hybrid spiral waveguides 52 coupled between an input free space region 54 and an output free space region 56. Each waveguide 52 is formed to comprise a hybrid spiral configuration of a different length, in accordance with the present invention, thus providing a relatively compact array configuration, while also minimizing bend-induced loss.

In order to properly configure an AWG, a constant increment in path length, as defined as $\Delta L$, is used in the formation of waveguides 52 for AWG 50, in the progression from the first waveguide 52-1 to the last waveguide 52-4. Thus, if first waveguide 52-1 is defined as having a length of L (measured from the output of input free space region 54 to the input of output free space region 56), second waveguide 52-2 is designed to have a length of $(L+\Delta L)$, third waveguide 52-3 is designed to have a length of $(L+2\Delta L)$, and fourth waveguide 52-4 is designed to have a length of $(L+3\Delta L)$. In some configurations, L may be on the order of meters, thus rapidly forming a relatively large area AWG if a hybrid spiral in accordance with the present invention is not used.

Each individual hybrid spiral waveguide 52 is formed to exhibit an interior region with a radius of curvature that approaches infinity at its center C, where an inward spiral arm 52-I joins an outward spiral arm 52-O (with, perhaps a thermo-optic phase shifter disposed at center C). The set of inward spiral arms 52-I for the "array" of waveguides is shown as exiting from input free space region 54. The set of outward spiral arms 532-O is shown as entering output free space region 56.

As mentioned above, one benefit of the hybrid configuration of the present invention is that the spacing between waveguides in the outer region of the spiral approaches a constant (uniform) value (the constant value being greater than a spacing that introduces unwanted evanescent coupling between adjacent waveguides). This aspect of the present invention is visible in AWG 50 of FIG. 10, where the spacing between outer waveguides in hybrid spirals 52-3 and 52-4 are shown as approaching a relatively constant value (i.e., uniform spacing).

In this particular example, AWG 50 is formed as a WDM, with a single input waveguide 55 and a plurality of output waveguides 57. Multiple signals, operating at different wavelengths, are all propagating along input waveguide 55, and AWG 50 is used to separate these signals, coupling a separate wavelength into a different output waveguide 57. As shown, input waveguide 55 is coupled to an input port of input free space region 54, with input terminations of waveguides 52 disposed at the output endface of free space region 54. The light beams then propagate through each hybrid spiral waveguide, experiencing the predetermined difference in optical path lengths that provide constructive/deconstructive interference at the output terminations of waveguides 52. As shown, the output terminations of waveguides 52 are applied as inputs to output free space region 56, which provides separate output wavelengths along each output waveguide 57.

Advantageously, the Fermat-like interior portion of the inventive hybrid spiral optical waveguide configuration is particularly useful when thermo-optic phase tuning is applied to an AWG structure, such as AWG 50. Due to imperfections in fabrication, optical waveguides have significant optical phase errors following fabrication. This phase error can be corrected by a number of methods, with a preferred method utilizing active turning of the optical waveguides using a thermo-optic phase shifter integrated into each separate waveguide of the AWG configuration. As the number of individual waveguides forming an AWG increases, thermo-optic tuning becomes the only viable option.

Referring to FIG. 10, a separate thermo-optic phase shifter 60 is disposed at the center of each hybrid spiral optical waveguide 52 (i.e., shifter 60-1 at the center of waveguide 52-1, shifter 60-2 at the center of waveguide 52-2, shifter 60-3 at the center of waveguide 52-3, and shifter 60-4 at the center of waveguide 52-4). Therefore, since each hybrid spiral waveguide of the arrayed waveguides includes an independently-controlled phase shifter, the optical phase of light passing through each can be adjusted such that the overall AWG device exhibits a maximum transmission of the desired wavelength through the desired output waveguide, while having a minimum crosstalk between channels.

Figure 11:
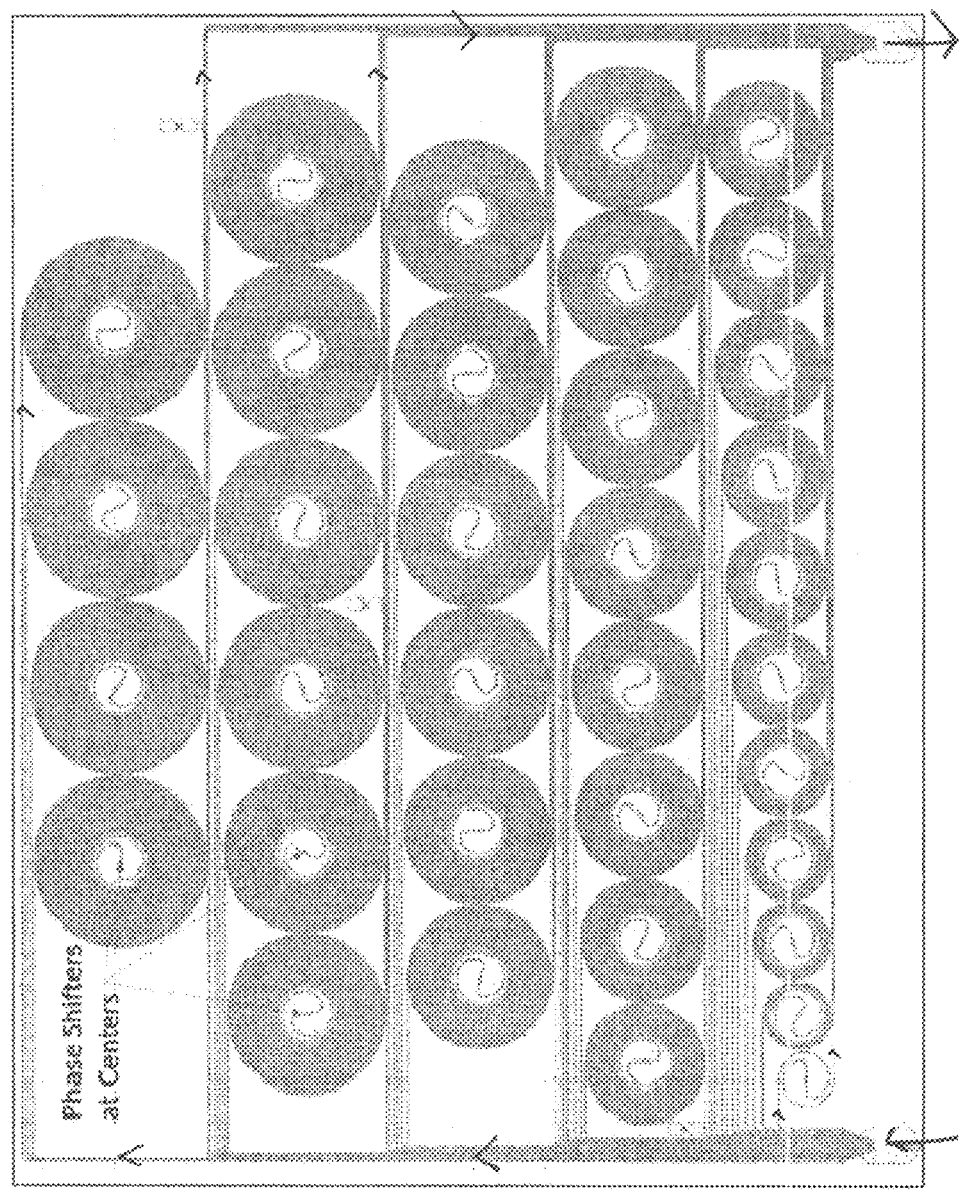
FIG. 11 depicts an exemplary AWG structure formed from a set of 35 hybrid spirals formed in accordance with the present invention.

FIG. 11 is a rendering from a photograph of an exemplary 35-count AWG that includes a plurality of hybrid spiral optical waveguides 70 formed in accordance with the present invention. This configuration has been found to be about 45% smaller than a 35-count AWG formed in the (relatively compact) "switchback" configuration described above.

The AWG of FIG. 11 was formed with partially etched silicon rib waveguides. Successive turns within a given spiral had a center-to-center spacing of about 7 µm, and adjacent spirals were spaced about 15 µm apart.

Inasmuch as the inventive hybrid spiral optical waveguide requires only partially-etched rib waveguides (as compared to fully-etched ridge waveguides of the switchback design), it is believed that the inventive arrangement will experience 40% less loss (associated with the elimination of the multiple bends required for the switchback geometry).

It will be understood that the 35-count AWG of FIG. 11 is offered only as a non-limiting example. In practice, AWGs with significantly higher counts of individual spiral configurations will be useful for various applications, and likewise, AWGs with counts as low as thirty-two, or even as low as eight or less will also be useful for some applications.

A useful figure of merit for AWGs is the waveguide density. For a given spiral configuration, the waveguide density is calculated by constructing a circumscribing square; that is, the minimal square that contains the waveguide configuration such that it is tangent to it at one point on each of its four sides. The waveguide density is the total length of the waveguide (over the spiral configuration), divided by the area of the circumscribing square.

Based on our studies, we believe that a waveguide density of 0.2 µm-1 or more is achievable in a fully etched silicon ridge waveguide, and that a waveguide density of 0.15 µm-1 or more is achievable in a partially etched silicon rib waveguide.

It is to be understood that the specific hybrid spiral geometry described above is only one exemplary type of "hybrid" spiral that exemplifies the desired benefits of: (1) the local radius of curvature at the center of the spiral being quite large (approaching infinity) such that there is minimal modal mismatch between the inward and output propagating modes (i.e., minimal optical loss in the transition between inward and outward propagating beams); and (2) the increasingly uniform spacing between adjacent waveguides in the outer region of the spiral, the latter requirement necessary to maximize waveguide density. If the spacing increases, the density will not be optimum, and if the spacing decreases, the waveguides will become too close together, to the point where evanescent coupling between optical beams propagating in adjacent waveguides begins to occur.

Additionally, while the above discussion has been based on PLC structures using silicon and silicon nitride waveguides, it is to be understood that the configuration of a hybrid spiral optical waveguide is not limited to this specific material system and is generally applicable to any type of electro-magnetic waveguide, operating at any frequency. Indeed, the ability to create dense waveguide structures in the form of hybrid spiral waveguides has benefits in any application where relatively long lengths of waveguide are required (including, but not limited to, optical delay lines, optical interferometers, distributed Raman amplifiers, AWGs, and the like).

Other applications and variations of the present invention will become apparent to those skilled in the art. The actual scope of the invention is intended to be limited only by the following claims when viewed in their proper perspective based on the prior art.

What is claimed is:

1. Apparatus comprising at least one high-density spiral-configured optical waveguide in which an inward-directed spiral arm and an outward-directed spiral arm are coupled together in a central portion of the spiral-configured waveguide, wherein:
the optical waveguide has multiple turns;
the spiral-configured waveguide has an outer region and an inner region;
in the outer region, the arms conform to a spiral of a first type having essentially uniform spacing between adjacent turns;
in the inner region, the arms conform to a spiral of a second type having a curvature that tends toward zero as the central portion is approached; and
each arm asymptotically conforms itself to the first-type spiral in the outer region and to the second-type spiral in the inner region;
wherein for each of the respective arms, a radius r is defined by the relation $$r = a\left(1 + \frac{k}{\theta}\right)^c \theta,$$

and $\alpha$ represents a constant and k and c are factors selected in combination with a known waveguide length L to define a minimum bend radius.

2. The apparatus of claim 1, wherein the at least one high-density spiral-configured optical waveguide is a partially-etched silicon rib waveguide.

3. The apparatus of claim 1, wherein, at an operating wavelength, coupling between the inward-directed spiral arm and the outward-directed spiral arm is effectuated with less than 0.5 dB of bend loss.

4. The apparatus of claim 1, wherein the type-1 spiral is an Archimedean spiral of the form $r=a\theta$, r represents a radius, $\theta$ represents a rotational angle, and a represents a constant.

5. The apparatus of claim 1, wherein:
the type-1 spiral is an Archimedean spiral of the form $r=a\theta$;
the type-2 spiral is a Fermat spiral of the form $r=b\theta^{1/2}$; and r represents a radius, $\theta$ represents a rotational angle, and a and b represent constants.

6. The apparatus of claim 1, further comprising at least one phase-control element, wherein:
the at least one phase-control element comprises a thermo-optic phase shifter disposed entirely within the inner region of the at least one high-density spiral-configured optical waveguide; and
the thermo-optic phase shifter is formed of a doped portion of silicon disposed alongside the at least one high-density spiral-configured optical waveguide.

7. The apparatus of claim 1, formed as a photonic lightwave circuit (PLC) component.

8. The apparatus of claim 1, wherein the inward-directed spiral arm and the outward-directed spiral arm each have at least eight turns, and wherein the outer region of essentially uniform spacing between adjacent waveguides is reached by the outward-directed spiral arm within six turns spiraling outward from the central portion.

9. The apparatus of claim 8, wherein the outer region where the spacing between adjacent waveguides is essentially uniform contains at least eight turns of the inward-directed spiral arm and at least eight turns of the outward-directed spiral arm.

10. The apparatus of claim 1, wherein the at least one high-density spiral-configured optical waveguide is a partially etched silicon rib waveguide, said waveguide has a waveguide density $\rho$ of at least 0.15 $\mu m^{-1}$, and $\rho$ represents waveguide length per unit area of a circumscribing square.

11. The apparatus of claim 1, wherein:
the at least one high-density spiral-configured optical waveguide is a partially etched silicon rib waveguide;
said waveguide has a location of greatest curvature; and
at said location, said waveguide has a bend radius in the range 35-100 $\mu m$.

12. The apparatus of claim 1, wherein:
the at least one high-density spiral-configured optical waveguide is a fully etched silicon ridge waveguide;
said waveguide has a location of greatest curvature; and
at said location, said waveguide has a bend radius in the range 6-12 $\mu m$.

13. The apparatus of claim 1, constituted as a high-density arrayed waveguide grating (AWG) structure comprising:
one or more input waveguides;
an input free space region;
an output free space region;
a plurality of output waveguides; and
a plurality of the high-density spiral-configured optical waveguides, wherein:
each of the high-density spiral-configured optical waveguides is disposed between the input free space region and the output free space region;
each of the high-density spiral-configured optical waveguides has a length; and
the lengths are stepped up incrementally over the said waveguide plurality.

14. The apparatus of claim 13, wherein the plurality of high-density spiral-configured optical waveguides comprises at least eight said waveguides arranged in an array.

15. The apparatus of claim 13, wherein the plurality of high-density spiral-configured optical waveguides comprises at least thirty-two said waveguides arranged in an array.

16. Apparatus comprising at least one high-density spiral-configured optical waveguide in which an inward-directed spiral arm and an outward-directed spiral arm are coupled together in a central portion of the spiral-configured waveguide, wherein:

the optical waveguide has multiple turns;

the spiral-configured waveguide has an outer region and an inner region;

in the outer region, the arms conform to a spiral of a first type having essentially uniform spacing between adjacent turns;

in the inner region, the arms conform to a spiral of a second type having a curvature that tends toward zero as the central portion is approached; and each arm asymptotically conforms itself to the first-type spiral in the outer region and to the second-type spiral in the inner region;

and wherein the apparatus further comprises a phase-control element disposed entirely within the inner region of the at least one high-density spiral-configured optical waveguide.

17. The apparatus of claim 16, constituted as a high-density arrayed waveguide grating (AWG) structure comprising:

one or more input waveguides;

an input free space region;

an output free space region;

a plurality of output waveguides; and a plurality of the high-density spiral-configured optical waveguides, wherein:

each of the high-density spiral-configured optical waveguides is disposed between the input free space region and the output free space region;

each of the high-density spiral-configured optical waveguides has a length; and the lengths are stepped up incrementally over the said waveguide plurality;

and wherein a respective phase shifter element is centrally disposed entirely within the inner region of each of the high-density spiral-configured optical waveguides.

18. The apparatus of claim 17, wherein each of the respective phase shifter elements comprises a thermo-optic phase shifter.

19. Apparatus comprising at least one high-density spiral-configured optical waveguide in which an inward-directed spiral arm and an outward-directed spiral arm are coupled together in a central portion of the spiral-configured waveguide, wherein:

the optical waveguide has multiple turns;

the spiral-configured waveguide has an outer region and an inner region;

in the outer region, the arms conform to a spiral of a first type having essentially uniform spacing between adjacent turns;

in the inner region, the arms conform to a spiral of a second type having a curvature that tends toward zero as the central portion is approached; and each arm asymptotically conforms itself to the first-type spiral in the outer region and to the second-type spiral in the inner region;

and wherein the at least one high-density spiral-configured optical waveguide is a fully etched silicon ridge waveguide, said waveguide has a waveguide density $\rho$ of at least $0.2\ \mu m^{-1}$, and $\rho$ represents waveguide length per unit area of a circumscribing square.

* * * * *